United States Patent [19]

Powers et al.

[11] Patent Number: 4,557,923
[45] Date of Patent: Dec. 10, 1985

[54] METHOD FOR PRODUCING AMMONIUM METATUNGSTATE FROM AMMONIUM PARATUNGSTATE

[75] Inventors: John A. Powers, New Albeny; James N. Christini, Towanda, both of Pa.

[73] Assignee: GTE Products Corporation, Stamford, Conn.

[21] Appl. No.: 728,648

[22] Filed: Apr. 29, 1985

[51] Int. Cl.$^4$ .............................................. C01G 41/00
[52] U.S. Cl. ..................................................... 423/593
[58] Field of Search ......................................... 423/593

[56] References Cited

U.S. PATENT DOCUMENTS

| | | | |
|---|---|---|---|
| 3,175,881 | 3/1965 | Chiola et al. | 423/593 |
| 3,857,928 | 12/1974 | Kim et al. | 423/593 |
| 3,857,929 | 12/1974 | Quatrini et al. | 423/593 |
| 3,936,362 | 2/1976 | Vanderpool et al. | 423/593 |
| 3,956,474 | 5/1976 | Ritsko | 423/593 |
| 4,504,461 | 3/1985 | Carpenter et al. | 423/593 |

Primary Examiner—H. T. Carter
Attorney, Agent, or Firm—Donald R. Castle

[57] ABSTRACT

A method is disclosed for producing ammonium metatungstate from ammonium paratungstate. The method involves first roasting the ammonium paratungstate at from about 275° C. to about 300° C. for from about 10 hours to about 20 hours to remove some ammonia and some water. The roasted ammonium paratungstate is then added to dilute solution of an ammonium metatungstate which is at a pH of from about 3.6 to about 4.2, the rate of addition being such that a slurry is produced having a pH of from about 3.6 to about 4.2. The pH of the resulting slurry is then adjusted to stabilize it at from about 3.6 to about 4.2 followed by evaporation to form a relatively concentrated solution of ammonium metatungstate which is then separated from any insolubles. Ammonium metatungstate is then crystallized from the relatively concentrated ammonium metatungstate solution.

9 Claims, No Drawings

METHOD FOR PRODUCING AMMONIUM METATUNGSTATE FROM AMMONIUM PARATUNGSTATE

FIELD OF THE INVENTION

This invention relates to a method for producing ammonium metatungstate from ammonium paratungstate. More particularly, it relates to a method for producing ammonium metatungstate from ammonium paratungstate by controlling the pH throughout the process.

BACKGROUND OF THE INVENTION

Tungsten, generally in the form of tungsten oxide, $WO_3$, is useful as a component of a variety of catalysts for chemical reactions. In most cases in the manufacture of these catalysts it is necessary at some stage to provide a water soluble tungsten compound from which the tungsten oxide is derived. For example, certain types of catalysts comprise porous carriers such as, for example, alumina impregnated with compounds of catalytic elements such as tungsten. In the preparation of such catalysts the carrier materials are immersed, or slurried, in solutions of the compounds of the catalytic elements and then dried, leaving the catalyst compound intimately associated with the carrier. Ammonium metatungstate, $(NH_4)_6H_2W_{12}O_{40}.xH_2O$ is a particularly useful solute in such solutions.

It offers the advantage of being readily soluble in water and, in addition, it decomposes readily on heating to leave the desired catalytic residue of tungsten oxide in the carrier. Alkali metal salts of the tungstates are also water soluble, but their use in catalyst manufacture is restricted by the fact that the presence of residual alkali metals frequently is objectionable in catalytic materials.

It has been proposed to obtain ammonium metatungstate solutions by baking crystalline ammonium paratungstate at temperatures of the order of 500° F. to drive off ammonia and to then dissolve the product of the baking operation in water. As is well known, a certain amount of ammonium metatungstate is produced by such a baking operation. However, thermogravimetric studies of this process have demonstrated that the ammonium paratungstate is not converted entirely to ammonium metatungstate at any particular temperature, nor after any particular baking time. To the contrary, other degradation products, particularly insoluble tungsten oxide also are continuously formed during the baking. In addition, certain amounts of unconverted ammonium paratungstate remain. As a result, substantial amounts of insoluble tungsten oxide and also ammonium paratungstate, which is only slightly soluble, remain undissolved when it it attemped to dissolve the product of the baking operation, making it necessary to filter the solution before use, and discard or reprocess the insoluble materials. Also, as indicated above, the small amount of paratungstate remaining in solution may complicate the use of the solution because of its tendency to precipitate out with temperature changes or evaporation of the water.

U.S. Pat. No. 3,472,613 discloses a mineral or organic acid reaction with a slurry of ammonium paratungstate to produce ammonium metatungstate. However, mineral and organic acids leave the ammonium salt of the acid in solution with the ammonium metatungstate and are thus a source of contamination.

U.S. Pat. No. 3,591,331 discloses a process for producing ammonium metatungstate without an appreciable formation of ammonium paratungstate. The process comprises contacting an aqueous ammonium tungstate solution having a pH of at least about 9 with an organic extractant solution comprising di-2-ethylhexyl phosphoric acid, and a water insoluble hydrocarbon solvent, the components being in specified ratios to extract ammonium ions from the aqueous solution, separating the resultant aqueous solution from the organic solution, heating the aqueous solution to a temperature of at least about 60° C. for at least about one hour and recovering an essentially pure ammonium metatungstate. In this process heteropoly tungstates are produced due to instability of the organic extractant.

U.S. Pat. No. 3,936,362 discloses a process for producing ammonium metatungstate and other species by passing tungstate ions through an anion exchange membrane into an aqueous solution containing ammonium cations under the driving force of an electrical potential for a time sufficient to achieve a pH within the range in which the desired tungsten compound will form.

U.S. Pat. No. 3,956,474 discloses a process for producing ammonium metatungstate from ammonium tungstate which involves the addition of about 3.6 percent by weight of silica to an ammonium tungstate solution, digestion for at least about 4 hours at a temperature of at least about 98° C. followed by filtration to remove silica from the ammonium metatungstate solution. Typically about 0.4 percent by weight of silica remains after filtering. The resulting ammonium metatungstate solution may be further processed to recover solid ammonium metatungstate, such as by evaporation or spray drying.

U.S. Pat. No. 3,857,928 discloses a process for producing crystalline ammonium metatungstate from ammonium tungstate solution by introducing the ammonium tungstate solution into an ion exchange column containing a weak acid (carboxylic group) cation exchange resin, and collecting the effluent from the column until a pH of about 3.5 is reached. The effluent solution is then digested at about 98° C. for about 5 hours, followed by crystallization of ammonium metatungstate by conventional processes, such as, evaporation or spray drying.

U.S. Pat. No. 3,857,929 discloses a process for producing crystalline ammonium metatungstate from ammonium tungstate solution by introducing a strong acid cation exchange resin containing sulfonic group batchwise into an ammonium tungstate solution until a pH of about 3.5 is reached. The resin is then removed by filtration and the filtered solution is digested at about 98° C. for at least about 5 hours, followed by crystallization of ammonium metatungstate by conventional processes, such as, evaporation or spray drying.

The amount of ammonia in ammonium tungstate requires a substantial quantity of resin with subsequent regeneration cost and the production of ammonium salts that must be disposed of.

U.S. Pat. No. 3,175,881 discloses a process for producing ammonium metatungstate by roasting ammonium paratungstate followed by digesting the roasted ammonium paratungstate in water. This process is only about 80% efficient in conversion of ammonium paratungstate to ammonium metatungstate with resulting cost in recycling the sludges produced.

Ammonium metatungstate has also been produced by digesting ammonium paratungstate slurries at boiling to convert to ammonium metatungstate. Long digestion times with huge energy input are required to produce ammonium metatungstate at reasonably efficient conversion.

Ammonium metatungstate can also be produced by dissolving tungstic acid in ammonia solution. This process is only about 50% efficient with subsequent difficult separation of unverted materials.

In view of the disadvantages of some of the above processes, an efficient method of producing ammonium metatungstate would be an advancement in the art.

SUMMARY OF THE INVENTION

In accordance with one aspect of this invention, there is provided a method for producing ammonium metatungstate from ammonium paratungstate. The method involves first roasting the ammonium paratungstate at from about 275° C. to about 300° C. for from about 10 hours to about 20 hours to remove some ammonia and some water. The roasted ammonium paratungstate is then added to a dilute solution of ammonium metatungstate which is at a pH of from about 3.6 to about 4.2, the rate of addition being such that a slurry is produced having a pH of from about 3.6 to about 4.2. The pH of the resulting slurry is then adjusted to stabilize it at from about 3.6 to about 4.2 followed by evaporation to form a relatively concentrated solution of ammonium metatungstate which is then separated from any insolubles. Ammonium metatungstate is then crystallized from the relatively concentrated ammonium metatungstate solution.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

By the process of this invention, crystalline ammonium metatungstate is produced from ammonium paratungstate in high yields by maintaining the pH in the desired range for ammonium metatungstate formation throughout the process.

Commercially available ammonium paratungstate which has the generally accepted formula $(NH_4)_{10}H_2W_{12}O_{41} \cdot xH_2O$ is first roasted to drive off ammonia and water vapor.

The roasting is carried out under conditions of time and temperature which result in an ignition weight loss of from about 5.8% to about 6.2%. At this value, the loss of ammonia and water is such that when a slurry is subsequently formed of the resulting roasted ammonium paratungstate and a dilute solution of ammonium metatungstate the pH will generally be in the desired range of from about 3.6 to about 4.2. If the ammonium paratungstate is overroasted, there will be excessive loss of ammonia resulting in a pH of less than about 3.6. Conversely, under roasting results in less ammonia being removed resulting in the pH being greater than about 4.2. Such conditions require subsequent additional pH adjustments to maintain the pH in the desired 3.6 to 4.2 range. Roasting conditions, of course, depend on the amount of material being roasted. Temperatures are generally from about 275° C. to about 300° C. and times are generally from about 10 hours to about 20 hours. At lower temperatures longer times are required to acquire the desired ignition loss. The preferred roasting conditions are at about 288° C. for about 14 hours for about 3500 pounds of ammonium paratungstate. The roasting is generally carried out in a conventional oven with the material in trays.

Prior to this invention, it has been the practice to form a slurry of the roasted ammonium paratungstate in water followed by digestion to convert the tungsten to the ammonium metatungstate structure. However, since the pH tends to be unstable, there is considerable liklihood that the pH can shift outside the critical (about 3.6 to about 4.2) range. Furthermore the rate of addition of the roasted ammonium paratungstate to the water is not controlled, that is, rather than being added continuously at a relatively uniform rate of addition, the addition process is intermittant or stage wise. For example, an entire charge of ammonium paratungstate can be added all at once followed by a period of no addition after which time more ammonium paratungstate can be added if deemed desirable. In such cases, if the charge is added too fast, the pH can drop below the critical range initially but subsequently it rises, usually above the critical range.

By the method of this invention, the pH is controlled at every step of the process.

The first step at which the pH is controlled is in the formation of the slurry. This is accomplished by (1) using instead of water a dilute solution of ammonium metatungstate which is at the desired pH range of from about 3.6 to about 4.2, and (2) adding the roasted ammonium paratungstate to the solution continuously at an average rate of addition such that the pH of the resulting slurry remains in this critical range.

The concentration of the dilute ammonium metatungstate is generally no greater than about 0.1 pound of ammonium metatungstate per gallon. Concentrations higher than this are impractical from an economic standpoint. The important factor is that the pH of the solution be in the critical range. The ammonium metatungstate solution is generally relataively pure having itself been subjected to previous purification, so that the final product of this process is not contaminated.

The dilute ammonium metatungstate solution can be derived in any number of ways, for example, (1) by dissolving ammonium metatungstate in water to give the appropriate concentration, (2) by adjusting the pH of an aqueous slurry of ammonium paratungstate with a source of hydrogen ions such as a cation exchange resin, tungstic acid or mineral acids, or (3) by using wash solutions of solids or liquors from previous batches of ammonium paratungstate or ammonium metatungstate with pH adjustment as described in (2). Although these types of solutions are typical, it is to be understood that any dilute solution of an ammonium metatungstate in the critical pH range can be used as long as it is of sufficient purity as not to contaminate the final product.

The roasted ammonium paratungstate is added to the dilute solution of ammonium metatungstate to form a slurry. Generally from about 1 to about 3 pounds of the roasted ammonium paratungstate are added per gallon of solution. Although the method can be carried out with larger portions of solution, obvious inefficiencies are introduced because of the necessity for evaporating the excess water. Slightly smaller quantities of solution can be used but there may not be efficient conversion of the ammonium paratungstate to the ammonium metatungstate, the result being lower yields. Preferably the dilute ammonium metatungstate solution is preheated to from about 90° C. to about 98° C. before the material is added to it.

As was mentioned previously, the rate of addition of the roasted ammonium paratungstate to the ammonium metatungstate solution is controlled so that the pH remains in the critical range of from about 3.6 to about 4.2. The rates are generally from about 5 to about 1,000 pounds of roasted ammonium paratungstate per minute. However, these rates can vary depending on factors such as initial pH of the solution, pH of the slurry, temperature, fluctuations in pH during the actual addition, etc.

Upon completion of the addition of the roasted ammonium paratungstate to the dilute ammonium metatungstate solution, the resulting slurry can be evaporated to form a concentrated ammonium metatungstate solution and the ammonium metatungstate crystallized. However, this procedure generally results in only about 88% by weight recovery of ammonium metatungstate. It is believed that the reason for this decreased efficiency is that the pH of the slurry can rise above about 4.2 to about 5.9 which is outside the critical range for efficient recovery of ammonium metatungstate. Therefore, it is preferable and the practice of this invention to stabilize the pH of the slurry if necessary so that it remains in the critical range throughout the entire process. This is done as described below.

After all the roasted ammonium paratungstate has been added and if the pH fluctuates outside the 3.6 to 4.2 range, the pH is adjusted to stabilize it in this range with a pH of about 3.8 being especially preferred. If the pH falls below about 3.6, a source of ammonium ions is added to raise the pH to the critical range. The preferred source of ammonium ions is ammonium paratungstate because it is compatible with the system. If the pH of the slurry rises above about 4.2, a source of hydrogen ions is added to lower the pH to the desired range. The source of hydrogen ions can be tungstic acid, a strongly acidic cation exchange resin, mineral acids as sulfuric acid, hydrochloric acid and nitric acid, or water soluble organic acids as acetic acid and lactic acid. Although mineral acids and water soluble organic acids can be used, they add a contaminating anion and are therefore not the preferred source. A strongly acidic cation exchange resin cone, in particular being ILLCO 211 from the Illinois Water Treatment Company, can be used. In this case the resin is generally added batchwise with continuous monitoring of the pH. However, this is not a preferred method because additional handling is required to subsequently separate the resin from the slurry or the resulting ammonium metatungstate solution. The preferred source of hydrogen ions is tungstic acid. This has the advantage of adding no contaminants and at the same time increasing productivity because generally about 50% of the tungstic acid itself is converted to ammonium metatungstate. When the pH remains essentially the same for about 20 minutes, it is considered to be stabilized.

The resulting pH stabilized slurry is then evaporated to a fraction, preferably about 20% of its original volume, to concentrate the ammonium metatungstate which is being formed and which is in solution. The evaporation is continued until the ammonium metatungstate in solution is from about 9.7 to about 11.6 pounds per gallon. Any insoluble material is then separated from this relatively concentrated solution by any standard technique such as filtration.

Crystalline ammonium metatungstate can then be recovered from the relatively concentrated solution by any conventional manner such as by taking a crystal crop or by spray drying.

Based on the $WO_3$ content of the starting ammonium paratungstate and the ammonium metatungstate produced, the yield is at least about 97%. To more fully illustrate this invention, the following non-limiting example is presented. All parts, portions, and percentages are on a weight basis unless otherwise stated.

About 6700 pounds of ammonium paratungstate are roasted at about 288° C. for about 14 hours to an ignition loss of about 5.7% to about 6.2%. The resulting roasted ammonium paratungstate is then added to about 3500 gallons of a solution of ammonium metatungstate having a concentration of about 0.05 pounds of ammonium metatungstate per gallon according to the following schedule.

Temperature from about 91° C. to about 95° C.

| Elapsed Time Min. | Roasted APT Added Pounds | Total APT Added Pounds | Total Elapsed Time | pH |
|---|---|---|---|---|
| 0 initial | | | | 4.46 |
| 1 | 1100 | 1100 | 01 | 4.90 |
| 1 | 1100 | 2200 | 02 | 4.60 |
| 1 | 1100 | 3300 | 03 | 4.06 |
| 1 | 00 | 3300 | 04 | 4.06 |
| 1 | 00 | 3300 | 05 | 4.05 |
| 1 | 00 | 3300 | 06 | 4.09 |
| 1 | 00 | 3300 | 07 | 4.12 |
| 1 | 560 | 3860 | 08 | 4.13 |
| 1 | 560 | 4420 | 09 | 4.12 |
| 1 | 560 | 4980 | 10 | 4.10 |
| 1 | 560 | 5540 | 11 | 4.08 |
| 1 | 560 | 6100 | 12 | 4.02 |
| 1 | 560 | 6660 | 13 | 3.82 |

It should be noted that the faster average rate of about 1100 pounds per minute results in a drop in the pH whereas the slower average rate of about 560 pounds per minute results in a rise in the pH. Therefore, by controlling the rate of addition, the pH can be controlled. Over about the next 7 minutes the pH rose steadily to about 3.90. At this point tungstic acid is added according to the following schedule to stabilize the pH.

| Elapsed Time from last pH measurement min | $H_2WO_4$ Added Pounds | Total $H_2WO_4$ Added Pounds | Total Elapsed Time min | pH |
|---|---|---|---|---|
| 1 | 06 | 06 | 20 | 3.94 |
| 3 | 12 | 18 | 23 | 3.96 |
| 1 | 0 | 18 | 24 | 3.93 |
| 1 | 0 | 18 | 25 | 3.97 |
| 1 | 0 | 18 | 26 | 3.93 |
| 1 | 0 | 18 | 27 | 3.93 |
| 1 | 0 | 18 | 28 | 3.99 |
| 1 | 0 | 18 | 29 | 3.96 |
| 1 | 0 | 18 | 30 | 4.01 |
| 1 | 0 | 18 | 31 | 4.01 |
| 3 | 13 | 31 | 34 | 3.96 |
| 1 | 0 | 31 | 35 | 3.93 |
| 1 | 0 | 31 | 36 | 3.95 |
| 1 | 0 | 31 | 37 | 3.95 |
| 1 | 0 | 31 | 38 | 3.94 |
| 1 | 0 | 31 | 39 | 3.93 |

-continued

| Elapsed Time from last pH measurement min | H$_2$WO$_4$ Added Pounds | Total H$_2$WO$_4$ Added Pounds | Total Elapsed Time min | pH |
|---|---|---|---|---|
| 1 | 0 | 31 | 40 | 3.94 |

At this point the pH is considered to be stabilized. The resulting pH stabilized slurry is then evaporated to about 675 gallons and a concentration of about 10 pounds of ammonium metatungstate per gallon. The insolubles are removed by filtration. The resulting ammonium metatungstate is then spray dried to recover ammonium metatungstate. While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing ammonium metatungstate from ammonium paratungstate, said method comprising:
(a) roasting said ammonium paratungstate at from about 275° C. to about 300° C. for from about 10 hours to about 20 hours to remove some ammonia and some water and form a roasted ammonium paratungstate:
(b) adding said roasted ammonium paratungstate to a dilute solution of an ammonium metatungstate which is at a pH of from about 3.6 to about 4.2 at an elevated temperature, the rate of addition of said roasted ammonium paratungstate being such that a slurry is produced having a pH of from about 3.6 to about 4.2;
(c) adjusting the pH of said slurry to stabilize the pH at from about 3.6 to about 4.2;
(d) evaporating the resulting pH stabilized slurry to a fraction of its original volume to form a relatively concentrated ammonium metatungstate solution;
(e) separating said relatively concentrated ammonium metatungstate solution from any insoluble material; and
(f) crystallizing ammonium metatungstate from said relatively concentrated ammonium metatungstate solution.

2. A method according to claim 1 wherein the concentration of said dilute solution of ammonium metatungstate is no greater than about 0.1 pounds of ammonium metatungstate per gallon.

3. A method according to claim 1 wherein said roasted ammonium paratungstate is added to said dilute solution of ammonium metatungstate at a temperature of from about 90° C. to about 98° C.

4. A method according to claim 1 wherein the pH of said slurry is stabilized by adjusting the pH to from about 3.6 to about 4.2 from a pH of less than about 3.6 with a source of ammonium ions.

5. A method according to claim 4 wherein said source of ammonium ions is ammonium paratungstate.

6. A method according to claim 1 wherein the pH of said slurry is stabilized by adjusting the pH to from about 3.6 to about 4.2 from a pH of greater than about 4.2 with a source of hydrogen ions.

7. A method according to claim 6 wherein said source of hydrogen ions is selected from the group consisting of tungstic acid, a strongly acidic cation exchange resin, sulfuric acid, hydrochloric acid, nitric acid, and water soluble organic acids.

8. A method according to claim 7 wherein said source of hydrogen ions is tungstic acid.

9. A method according to claim 1 wherein from about 97% to about 100% by weight of the starting ammonium paratungstate is converted to ammonium metatungstate.

* * * * *